…

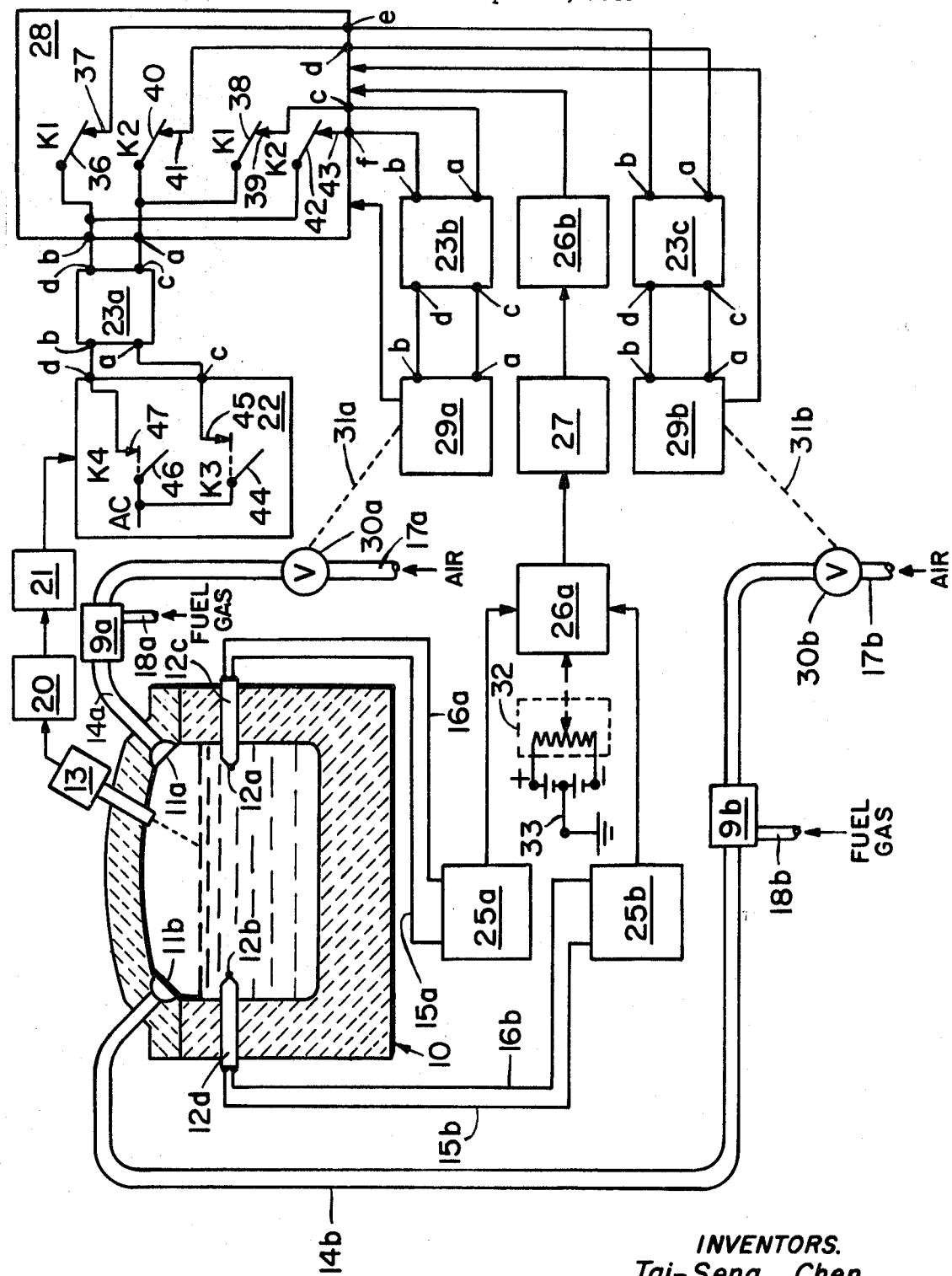

United States Patent Office 3,600,149
Patented Aug. 17, 1971

3,600,149
TEMPERATURE CONTROL SYSTEM FOR A GLASS TANK FOREHEARTH
Tai-Seng Chen, Lafayette, Ind., and Kenneth A. Cook and Bernard P. McDonnell, Elmira, N.Y., assignors to Corning Glass Works, Corning, N.Y.
Filed Sept. 26, 1969, Ser. No. 861,246
Int. Cl. G12b 1/00
U.S. Cl. 65—162                                12 Claims

ABSTRACT OF THE DISCLOSURE

A system for controlling the temperature of a bath or pool of molten glass in a forehearth so that the temperatures of such glass at first and second opposite sides of the forehearth are equal or differ from each other by a preselected amount. Such system may be employed in conjunction with prior known systems for maintaining the temperature of the molten glass, at a selected point between said sides of the forehearth, at a preselected temperature.

BACKGROUND OF THE INVENTION

In many glass making operations it is expedient that molten glass issuing from a forehearth be relatively precisely maintained at a predetermined temperature within a preselected temperature range for optimum working or forming of the molten glass into desired articles or ware. For example, in one well known apparatus and process for forming glass tubing, molten glass is flowed downwardly about the outer periphery of a continuously rotating sleeve, through an annular outlet in the bottom of a forehearth and around a hollow mandrel or bell shaft which also extends downwardly through the bath of molten glass in the forehearth and through said outlet. The rotation of said sleeve in the bath of molten glass tends to cause the glass at one side of the forehearth to move more rapidly to said outlet than the glass at the other side of the forehearth thereby resulting in a difference in the temperatures of the glass from side to side in the forehearth or a difference in excess of a desired difference in such temperatures and, therefore, an undesirable difference in the temperatures of the glass flowing out of the forehearth outlet and downwardly about opposite peripheral sides of the aforementioned hollow sleeve and bell shaft. Such a difference in temperatures often causes the tubing, formed by a process and apparatus such as that just briefly described, to have an undesirable or intolerable fault in which the centers of the inner and outer circumferences of the walls of the tubing do not coincide, that is to say, a condition in which the walls of the tubing are not of uniform thickness. Such condition is commonly termed "siding" in the glass making art. It is, accordingly, an object of the present invention to provide a system for maintaining the temperature of molten glass in a forehearth at a desired temperature, or within a desired working temperature range, and, at the same time, maintaining the temperatures of the glass from side to side in the forehearth at the same temperature as each other or at temperatures which differ from each other only by a predetermined amount or number of degrees.

SUMMARY OF THE INVENTION

In accomplishing the above object of the invention there is provided, in conjunction with a modification of known apparatus for sensing the temperature of molten glass in a forehearth and maintaining such glass at a predetermined desired temperature therefor, additional apparatus, including a pair of thermocouples for sensing the temperatures of the molten glass adjacent opposite sides of the forehearth, and a pair of control valves and associated valve drive units for controlling such temperatures in accordance with the sensing thereof, such known and additional apparatus being combined to provide a composite temperature control system which operates to control said temperatures in accordance with said object of the invention.

Other objects and characteristic features of the invention will become apparent as the description proceeds.

BRIEF DESCRIPTION OF THE DRAWINGS

The single drawing figure of the specification schematically illustrates the control system embodying the invention.

PREFERRED EMBODIMENT OF THE INVENTION

There is shown in the drawing a cross-section of a molten glass forehearth 10 containing a pool or bath of molten glass. Such forehearth is provided with first and second gas-air combustion burners 11a and 11b which are located adjacent the top of the interior of forehearth 10 at first and second opposite sides thereof. Burners 11a and 11b are able to uniformly transfer radiant heat in controlled patterns and such burners are located in the interior of forehearth 10 so that each transfers heat to approximately the half of the molten glass bath located generally below each respective burner. Burners such as 11a and 11b are well known and each may, for example, be a Series 552 high-temperature gas burner such as manufactured and sold by Selas Corporation of America under Catalog Number KZ552-SN3 and which is described in a Bulletin No. DB-2 published by such company. Selas Corporation of America is located at Dresher, Pa.

First ends of a pair of pipes or conduits 14a and 14b are connected to burners 11a and 11b, respectively, for supplying a suitable gas-air mixture thereto for combustion and heating purposes. The second ends of conduits 14a and 14b are connected through gas-air mixtures 9a and 9b, respectively, to first ends of conduits 18a and 18b, respectively, whose second ends are connected to a suitable source of fuel gas which is not shown in the drawings for purposes of simplification thereof. Mixers 9a and 9b are also connected to the output ports of flow control valves 30a and 30b, respectively, the other ends of such valves being connected by conduits 17a and 17b, respectively, to a suitable air supply from an air pressure source which is also not shown in the drawings for purposes of simplification thereof. Valves 30a and 30b are valves such as are usually used in automatic control systems of the type herein described and each such valve may, for example, be a North American adjustable port valve of a suitable size and capacity. Such valves are manufactured and sold by North-American Manufacturing Company whose address is 4455 E. 71st St., Cleveland, Ohio. As indicated in the drawing by the dotted lines 31a and 31b, respectively, valves 30a and 30b are mechanically connected, for driven actuation thereof, to valve controllers or drive units 29a and 29b, respectively, to be discussed in more detail hereinafter in the description. Valves 30a and 30b will also be further discussed hereinafter in an operational example of the invention.

There is also shown in the drawing a pair of similar thermocouples 12c and 12d having junctions 12a and 12b, respectively, and which may be any of the suitable types of such thermocouples known in the art. The terminals of thermocouple 12c are connected over electrical conductors 15a and 16a to the input of a first amplifier or temperature-EMF signal transmitter 25a to be hereinafter discussed. Similarly, the terminals of thermocouple 12d are connected over electrical conductors 15b and 16b to the input of a second amplifier or temperature-EMF signal transmitter 25b which will also be hereinafter discussed. Thermocouples 12c and 12d will also be discussed further hereinafter in an operational example of the invention.

A suitable radiation pyrometer 13 is positioned in the top of forehearth 10 so that it can sense the temperature of the bath of molten glass in the forehearth at a point slightly to the right of the center of such bath as illustrated in the drawing. The electrical or EMF signal from pyrometer 13 has a value representative of the temperature of the molten glass bath in forehearth 10 and such output signal is, as indicated in the drawing, supplied over a suitable electrical conductor to the input circuit of a set point unit 20 discussed below in more detail. Radiation pyrometers such as 13 are well known and such pyrometer may, for example, have a spectral band width from 0.4–1.2 micron.

The aforementioned set point unit 20 is adjusted to provide a D-C millivoltage (EMF) signal that represents or is proportional to the set point temperature of the bath of molten glass in forehearth 10, that is to say, the desired temperature of the molten glass bath in forehearth 10. Such EMF signal is compared to or algebraically summed with the D-C millivoltage (EMF) signal supplied to unit 20 from pyrometer 13 and representing or proportional to the sensed or actual temperature of the glass bath in forehearth 10 as sensed by such pyrometer. Such comparison or summation of the set point and sensed signals produces at the output of unit 20 a resultant or error millivoltage (EMF) signal proportional to or representative of any difference in said signals, that is, any deviation of the sensed temperature signal from the set point signal. If, of course, there is no such difference or deviation in said signals, no resultant output or error signal is produced. The output or error signal from set point unit 20 is supplied as an input to a deviation amplifier 21 discussed below. Set point units such as 20 and their mode of operation are well known in the art and such unit may, for example be a M-Line Model C–2 low-level set point unit such as manufactured and sold by Leeds and Northrup Company, Rockland and Stention Aves., Philadelphia, Pa.

Amplifier 21 amplifies said resultant or error signal, supplied thereto from set point unit 20, to a level suitable for use by a controller or control unit discussed below. The gain of amplifier 21 may, for example, be adjusted so that the output thereof is a D-C voltage signal within the range of −2.0 to +2.0 volts for any error signal applied to the input of the amplifier. The output signal from amplifier 21 is supplied as an input signal to a suitable control unit or controller 22 mentioned above and which may, for example, be an M-Line, Model C–2 P.A.T. (position-adjusting type) Controller such as manufactured and sold by the above-mentioned Leeds and Northrup Company. Also, amplifier 21 may, for example, be a M-Line deviation amplifier Model C1 such as manufactured and sold by Leeds and Northrup Company. However, amplifiers such as 21 and controllers or control unit such as 22 are well known and other amplifiers and controllers may be used for components 21 and 22, as will be readily apparent to those skilled in the art.

The amplified output or error signal from amplifier 21 is supplied to the input of controller or control unit 22 as mentioned above. Controller 22 is selected or arranged to provide for two-action control, that is, for proportional and reset control functions. Controller 22 is also selected or arranged for forward control action, that is, is arranged so that the final control elements (valves 30a and 30b previously discussed) will be adjusted as an inverse function of the process variable which is the temperature of the molten glass bath in forehearth 10. In other words, as hereinafter discussed, controller 22 is arranged so that the previously mentioned fuel control valves 30a and 30b will be further opened to increase the fuel supply to burners 11a and 11b in forehearth 10 when the temperature of the molten glass bath in the forehearth falls below the desired temperature as represented by the preset or set point signal supplied by unit 20 as previously discussed. Similarly, controller 22 is also arranged so that fuel control valves 30a and 30b will start to close when the temperature of said glass bath rises above the desired temperature therefor as represented by said preset or set point signal. This will also be further discussed later in the description.

Controller or control unit 22 includes a pair of relays K3 and K4 which are selectively actuated according as the output or error signal (−2.0 to +2.0 volt range) from amplifier 21 and supplied to the input of controller 22 is negative or positive, respectively. Relays K3 and K4 are an integral part of controller 22 and, therefore, the control windings of the relays are not shown in the drawings for purposes of simplification thereof. However, a contact of each such relay is shown in the drawings, the movable and fixed contact members of relay K3 being designated 44 and 45, respectively, and the corresponding members of relay K4 being designated 46 and 47, respectively. The movable members of said contacts K3 and K4 are connected to a terminal AC of a source of alternating current of a suitable voltage and capacity for operating apparatus to be hereinafter discussed. Such source of alternating current may, for example, be the usual 110 v. commercial source, as is readily apparent.

Fixed contact points 45 and 47 of relays K3 and K4 are connected over first and second suitable electrical conductors to output terminals c and d, respectively, of unit 22 and thence to input terminals a and b, respectively, of a first control station or operating module 23a which permits manual transfer between manual and automatic control without the introduction of a transitory control effect into the control system and a resulting upset of the system thereby requiring a time period of substantial duration before smooth control can be reestablished. When module 23a is an automatic operation, electrical connectios are made through the module from said input terminals a and b thereof to output terminals c and d, respectively, of the module.

Terminals c and d of control station or operating module 23a are connected to input terminals a and b, respectively, of a D-C voltage comparator 28 to be hereinafter discussed. Operating modules such as 23a are well known in the art and such module may, for example, be an M-Line, Model C–1 P.A.T. (position-adjusting type) Operating Module such as manufactured and sold by the aforementioned Leeds & Northrup Company. The apparatus including components 20, 21, 22 and 23a forms part of a temperature control system of a type well known in the art and such a system is described in a Bulletin E4.1321–1967 published by the Systems Department of Leeds & Northrup Company which is located in North Wales, Pa. If additional information relating to a temperature control system of the type thus far described is desired, reference may be made to said bulletin, copies of which may be obtained from such company.

The previously mentioned amplifiers or temperature-EMF signal transmitters 25a and 25b whose inputs are connected to thermocouples 12c and 12d, respectively, produce D-C voltage output signals which vary linearly with changes in the EMF signal inputs supplied to the transmitters and which are representative of or proportional to changes in temperatures in the parts of the molten glass bath adjacent the right and left hand sides, respectively, of forehearth 10. The output of transmitter 25a may, for example, be 0 to +10 v. signal for an input signal thereto representing a 500° temperature range from 685° to 1185° C., and the output of transmitter 25b may, for example, be 0 to −10 v. signal for an input signal representing a similar temperature range supplied to such transmitter. Under such conditions the output signals of transmitters 25a and 25b vary 0.02 v. per each 1° C. change in temperature as is readily apparent. Transmitters 25a and 25b may, for example, be M-Line temperature- EMF transmitters which are manufactured and sold by the afore-mentioned Leeds & Northrup Company.

The output signals from transmitters 25a and 25b are supplied as inputs to the summing junction of an operational amplifier 26a which, for example, may have a gain of 5. If it is desired that the molten glass adjacent the opposite sides of forehearth 10 be maintained at other than a zero temperature differential, a bias voltage which may, for example, range between −0.2 v. to +0.2 v. for a temperature differential range from −10° C. to +10° C. is also supplied to the summing junction of amplifier 26a. As indicated by the broken line arrow in the drawing, such bias voltage may be supplied to amplifier 26a from the wiper arm of a suitable manually adjustable potentiometer 32 whose winding is connected across the positive and negative terminals (+ and −) of a suitable source of direct current such as a battery having a center tap connected to ground so that the voltage between ground and the wiper arm of potentiometer 32 can be continuously adjusted from −0.2 v. to +.2 v. as previously mentioned. The voltage signals supplied to said summing junction of amplifier 26a and, if said bias voltage is provided, the voltage from potentiometer 32, are all algebraically summed in amplifier 26a and a resultant voltage signal is produced which is representative of or proportional to any undesired differences in the side-to-side temperatures of the bath of molten glass in forehearth 10. If it is desired that there be no difference in said side-to-side temperatures, no bias signal is supplied to amplifier 26a and said algebraic summation will produce a resultant zero voltage signal if, in fact, said side-to-side temperatures are in agreement. If, however, such temperatures are out of agreement, said algebraic summation will produce a resultant voltage signal having a value and direction (polarity) proportional to or representative of the differences in said temperatures. When amplifier 26a, as previously mentioned, has a gain of 5 such resultant signal will be +0.10 v. per each 1° C. of temperature differential. If, of course, it is desired that the temperature of the glass adjacent one side of forehearth 10 be maintained at a higher or lower temperature than the temperature of the glass adjacent the other side of the forehearth, the appropriate bias voltage is selected by the wiper arm of potentiometer 32 and is supplied to amplifier 26a so as to produce a resultant output signal representative of or proportional to the desired temperature differential. When such temperature differential exists in fact, said output signal will be proportional to and of a polarity representative of the desired temperature differential selected by the setting of the wiper arm of potentiometer 32. If said temperature differential deviates from the desired temperature differential, the resultant output signal from amplifier 26a will be of a value and direction to indicate or reflect the undesired temperature differential deviation and, as discussed hereinafter, the apparatus will operate to correct such deviation.

Operational amplifiers such as 26a are well known in the art and such amplifier may, for example, be a self-contained medium-gain operational amplifier which is manufactured and sold by Leeds & Northrup Company. Such amplifier, in actuality, contains a group of four separate differential-type amplifiers and, if an amplifier such as that mentioned is employed in practicing the invention, a first of the differential amplifiers contained therein is employed to provide the previously mentioned summing junction and amplifier having a gain of 5, and two of the remaining differential-type amplifiers may, if desired, be used for adjustable dead band circuits in the manner well known in the art. In such case, the output from said first differential amplifier is supplied as an input to an adjustable dead band circuit comprising said two remaining amplifiers which are arranged to provide a gain of one above the preset dead band. Such two remaining differential amplifiers are employed to accommodate both the positive and the negative dead band and the nominal setting is ±0.05 v. per ±0.5° C. The output signal from the two differential amplifiers of said dead band circuit is supplied to the fourth differential amplifier of said group of four such amplifiers. Such fourth amplifier is used as an isolation amplifier which is also provided with a gain of 1 (unity). The output signal from such isolation amplifier is supplied to the input of a controller or control unit 27.

Controller or control unit 27 is arranged to provide for proportional and reset control action and such control unit may, for example, be a M-Line, Model C−1 C.A.T. (current-adjusting type) Controller which is arranged for center-zero output signals and which is manufactured and sold by Leeds & Northrup Company. However, controllers or control units such as 27 are well known and other controllers or control units may be used for component 27 as will be apparent to those skilled in the art.

The amplifier output signal from amplifier 26a is, as mentioned above, supplied to the input of controller or control unit 27 which is, as also previously mentioned, arranged to provide for two-action control, that is, for proportional and reset control action. The output signal (−2.0 ma. to +2.0 ma.) from control unit 27 is supplied (through a suitable load resistance), to the input of an operational amplifier 26b which may, for example, be identical to amplifier 26a previously discussed. Two of the differential amplifiers in component 26b are used in an adjustable limiter circuit including a diode bridge network to prevent control action above and below preset positive and negative levels, respectively, in the manner well known in the art. Such control action may, for example, be nominally set at ±20% of full travel of the previously mentioned flow control valves 30a and 30b. The output signal from amplifier 26b (the limiter circuit) is supplied as an input signal to previously mentioned D-C voltage comparator 28 which is a dual channel differential amplifier connected in a differential input summing configuration. The two channels of the amplifier include relays K1 and K2 which are associated with first and second ones, respectively of such channels and which will be discussed further hereinafter.

The previously mentioned valve positioners or drive units 29a and 29b each include an adjustable potentiometer each of which is driven by the motor of the respective unit or positioner to provide a feedback voltage output signal proportional to or having a value representing the position of the respective valve 30a and 30b associated with positioners 29a and 29b, respectively. Such feedback signals are supplied to comparator 28 where they are summed with the signals supplied from the aforesaid limiter circuit to such comparator to thereby energize relay K1 or K2 in comparator 28 as discussed below.

When the input signal (+10 v. to −10 v.) supplied to comparator 28 from said limiter circuit is more negative than the voltage setting of the potentiometer in valve positioner or control unit 29a (0 to −10 v.) the output from said first channel or channel 1 of comparator 28 is positive and relay K1 is energized and caused to open its contacts comprising movable and fixed contact members 36 and 37, respectively, and movable and fixed contact members 38 and 39, respectively. On the other hand when the input signal supplied to comparator 28 from said limiter circuit is more positive than the voltage setting of the potentiometer in valve positioner or control unit 28b (0 to +10 v.) the output from channel 2 is positive, and relay K2 is energized and caused to open its contacts comprising movable and fixed contact members 40 and 41, respectively, and movable and fixed contact members 42 and 43, respectively. When no signal or a zero input signal is supplied to comparator 28 relays K1 and K2 are, of course, both deenergized and maintain their respective said contacts closed. Comparators such as 28 are also well known and such component may, for example, be a High Level D.C. Voltage Comparator such as manufactured and sold by Leeds & Northrup Company. Relays K1 and K2 are an integral part of controller 28 and, therefore, the control windings of such relays are omitted from the drawings for purposes of simplification thereof.

The previously mentioned alternating current (110 v.) supplied to input terminal *a* of comparator 28 flows through a first circuit which extends from such terminal *a* over contact members 38–39 of relay K1 to an output terminal *c* on comparator 28 and thence to an input terminal *a* of a control station or operating module 23*b* which may, for example, be similar to component 23*a* previously discussed. Said alternating current also flows through a second circuit which extends from said input terminal *a* of comparator 28 over contact members 40 and 41 of relay K2 to an output terminal *d* on comparator 28 and thence to an input terminal *a* of a control station or operating module 23*c* which may also be similar to component 23*a* previously described.

Alternating current supplied to input terminal *b* of comparator 28 flows over first and second multiple circuits, the first of which may be traced from such terminal *b*, over contact members 36–37 of relay K1 to an output terminal *e* of comparator 28 and thence to an input terminal *b* of previously mentioned component 23*c*. The second of said multiple circuits extends from terminal *b* of comparator 28 over contact members 42–43 of relay K2 to output terminal *f* of the comparator and thence to input terminal *b* of previously mentioned component 23*b*.

When control module 23*b* is on automatic operation, alternating current supplied, as discussed above, to input terminal *a* of such control module, flows through such module to output terminal *c* thereof and thence to input terminal *a* of valve positioner or drive unit 29*a* previously mentioned and hereinafter further discussed. Similarly, alternating current supplied to input terminal *b* of control module 23*b* flows through such module to output terminal *d* thereof and thence to input terminal *b* of positioner or drive unit 29*a*.

When control module 23*c* is on automatic operation, alternating current supplied, as discussed above, to input terminal *a* of such module, flows through such module to output terminal *c* thereof and thence to input terminal *a* of valve positioner or drive unit 29*b* also previously mentioned and hereinafter further discussed. Similarly, alternating current supplied to input terminal *b* of control module 23*c* flows through the module to output terminal *d* thereof and thence to input terminal *b* of valve positioner or drive unit 29*b*.

Valve positioner or drive unit 29*a* includes forward and reverse control windings and, when alternating current is supplied to input terminal *a* of the positioner as discussed above, the reverse control winding is energized and positioner 29*a* drives valve 30*a* towards its closed position. When alternating current is supplied to input terminal *b* of positioner 29*a* as previously discussed, the forward control winding is energized and the positioner drives valve 30*a* to further open such valve. The adjustable potentiometer in positioner 29*a* is also correspondingly driven at such times so that the output signal from such potentiometer always remains proportional to or representative of the position of valve 30*a*.

Similarly, valve positioner or drive unit 29*b* includes forward and reverse control windings which are individually energized by the alternating current supplied to input terminals *b* or *a*, respectively, of the controller as previously discussed. Such energization of the forward or reverse control windings of control unit 29*b* causes such unit to drive valve 30*b* to a further open position or towards its closed position, respectively. The adjustable potentiometer in positioner 29*b* is correspondingly driven so that the output signal therefrom always remains representative of or proportional to the position of valve 30*b*. Valve positioners or drive units such as 29*a* and 29*b* are well known in the art and each unit may, for example, be a valve drive unit which is manufactured and sold by Leeds & Northrup Company under List No. 10266–60.

The structure or arrangement of the apparatus of the control system embodying the invention having been discussed in detail, several brief operational examples of the invention will be set forth.

It is believed expedient at this point in the description to point out that suitable sources of alternating and direct currents are provided for the operation of the components shown in the drawing but such sources are not shown therein for purpose of simplification thereof. Similarly, connections from the components to ground are also omitted from the drawing for purpose of simplification thereof.

It should also be pointed out that the contacts of relays K3 and K4 in controller or control unit 22 do not remain open as shown in the drawing but are intermittently operated to their closed positions as indicated by the dotted lines showing the movable contact members 44 and 46 closed against fixed contact members 45 and 47, respectively. The time periods of such closure of said contacts are substantially equal for both relays K3 and K4 when no control signal from pyrometer 13 and set point unit 20 is being received by controller 22.

It will first be assumed that pyrometer 13 senses an increase in temperature of the molten glass bath in forehearth 10 and, therefore, supplies an increased signal to set point unit 20 for comparison with the set point signal of such unit, thereby resulting in an output, or differential or error signal from the set point unit which is representative or proportional to adjustment necessary in burners 11*a* and 11*b* to bring the temperature of the molten glass back into agreement with the desired temperature therefor as represented by said set point signal. Such resultant or error signal is supplied from unit 20 to amplifier 21 and thence to controller or control unit 22 where relay K3 is actuated to close its contact members 44–45 for substantially longer periods of time than the closures of contact members 46–47 of relay K4. Alternating current is therefore, supplied over contact members 44–45 of relay K3 for longer periods of time, such current flowing from output terminal *c* of unit 22 to input terminal *a* of control station or operating module 23*a*, output terminal *c* of module 23*a*, input terminal *a* of comparator 28 and thence over multiple circuits extending over contact members 40–41 of relay K2 to output terminal *d* of comparator 28 and over contact members 38–39 of relay K1 to output terminal *c* of comparator 28. The alternating current further flows from said output terminals *c* and *d* to input terminals *a* of operating modules 23*b* and 23*c* and thence to input terminals *a* of valve positioners 29*a* and 29*b* and through the reverse windings of such positioners to energize such windings to actuate valves 30*a* and 30*b* towards their closed positions to thereby reduce fuel flow to burners 11*a* and 11*b* to lower the temperature of the molten glass in forehearth 10. When such temperature has returned to its desired temperature as represented by the set point signal supplied to unit 20, the differential or error signal is terminated and relay K3 returns to its normal operation to supply to output terminal *c* of unit 22 A-C pulses equal in time to those supplied to relay K4 to output terminal *d* of unit 22.

When the temperature of the molten glass in forehearth falls or decreases below the desired temperature therefor as represented by the set point signal supplied by unit 20, pyrometer 13 senses the decreased temperature and the sensed signal from the pyrometer is supplied to unit 20 where it is compared or algebraically summed with the preset signal to produce a differential or error signal representative of or proportional to the deviation of the temperature of the molten glass from the desired temperature therefor as represented by the preset signal. The error signal is supplied through amplifier 21 to controller 22 to cause relay K4 to close its contact members 46-47 for longer periods of time than contact members 44-45 of relay K3. The alternating current supplied over contact members 46-47 at such time is supplied to circuits similar to those described in the above example of the operation of relay K3. Such circuits include contact members 36-37 of relay K1 and contact members 42-43 of relay K2 in comparator 28 and the forward windings of positioners 29a and 29b. The alternating current supplied to said forward windings at such time actuates drive units or positioners 29a and 29b to further open valves 30a and 30b to increase the supply of fuel to burners 11a and 11b to thereby bring the temperature of the molten glass back into agreement with the desired temperature therefor as represented by the preset signal in unit 20. When the desired temperature for the molten glass is attained, the error signal from unit 20 is terminated and relay K4 returns to its normal operation.

It will now be assumed that the temperature of the molten glass sensed by thermocouple 12c adjacent the right side of forehearth exceeds the temperature of the molten glass sensed by thermocouple 12d adjacent the left side of the forehearth by an amount greater than a preselected desired amount in excess of the temperature differential provided by the previously mentioned dead band circuit including the previously discussed amplifiers in component 26a. Under such conditions the signals originated by thermocouples 12c and 12d in the forehearth 10 and supplied to transmitters 25a and 25b for transmission to component 26a will, when summed in such component, provide a differential output signal representing or proportional to said amount of temperature in excess of the temperature differential provided by the adjustment of said dead band circuit. Such output signal is supplied from component 26a to the input of controller or control unit 27. Control unit 27, in turn, supplies from its output to the input of operational amplifier 26b a signal representing the aforesaid temperature differential. Amplifire 26b supplies to comparator 28 a voltage signal proportional to the input signal supplied to such amplifier. The potentiometers in drive units or valve positioners 29a and 29b are also supplying to comparator 28 voltage signals representative of or proportional to the positions of valves 30a and 30b. The three signals are compared in comparator 28 and a resultant signal is produced which energizes relay K2 in comparator 28 and opens the previously described circuits extending over contact members 40-41 and 42-43 of relay K2.

The previously mentioned intermittent pulses of AC being supplied to comparator 28 by relays K3 and K4 in component 22 are supplied to output terminals c and e of comparator 28 from where they flow to input terminals a and b, respectively, of units 23b and 23c, respectively. Such signals are further supplied to input terminals a and b of valve positioners 29a and 29b, respectively, to continue to energize the reverse and forward control windings, respectively, of such positioners. No pulses of alternating current are supplied to terminals b and a of positioners 29a and 29b at such time because the circuits to such terminals are open at contact members 42-43 and 40-41 of relay K2 in comparator 28. The alternating current pulses supplied only to the forward and reverse control windings of positioners 29b and 29a, respectively, causes such positioners to drive their respectively associated valves 30a and 30b towards their closed and further open positions, respectively. Such actuation of the valves raises and lowers the temperatures of the molten glass adjacent the left and right sides, respectively, of forehearth 10 until such temperatures are in agreement with each other or differ from each other only by the previously mentioned desired temperature differential and the permissive differential provided by the previously discussed dead band circuit. The signals then compared or summed in comparator 28 produce no resultant or error signal and relay K2 is again deenergized to cause alternating current pulses to again be supplied to terminals b and a of drive units 29a and 29b, respectively.

By the above detailed example of the operation of the apparatus it will be readily apparent to those skilled in the art how the control windings of valve positioners 29a and 29b are selectively energized to actuate valves 30a and 30b when the temperature of the molten glass adjacent the right side of forehearth 10 decreases below the temperature of the molten glass adjacent the left side of the forehearth so that a temperature differential exists in excess of a desired temperature differential provided for by potentiometer 32 or by the dead band circuits in component 26a. It will also be apparent from said operational example how valves 30a and 30b are actuated to correct undesired side-to-side temperature differentials in the molten glass due to an excessive increase or decrease of the temperature of such glass adjacent the left side of forehearth 10. Therefore, no further detailed operational examples of the invention are considered necessary for a complete understanding of the invention by persons skilled in the art.

It is pointed out that, where the terms "temperature differential," "differential temperature" or similar terms are employed herein, such term or terms are intended to include a zero temperature differential or a temperature which is equal to another as well as a temperature which differs from another in positive or negative modes, that is, in positive or negative going directions.

We claim:

1. In combination with a first control system for maintaining the temperature of a bath of molten material in a forehearth or furnace at a desired temperature or within a desired temperature range therefor, such system including;

(A) means for sensing the temperature of said molten material and producing an output signal representing the sensed temperature;

(B) means providing a set-point signal representing the desired temperature for said molten material and comparing such signal with said sensed signal to produce a differential signal representing any difference in the compared signals;

(C) first and second heating means for supplying heat to similar first and second halves of said bath of molten material;

(D) first and second adjustable means for adjusting the amount of heat supplied by said first and second heating means, respectively, and (E) first and second means responsive to said differential signal for controlling said first and second adjustable means, respectively, to maintain the temperature of said bath at the desired temperature therefor; an additional control system, operating in conjunction with said first control system, for maintaining the temperatures of said first and second halves of said molten material within a selected differential temperature range, such additional system comprising;

(a) first and second temperature responsive means for sensing the temperatures of said first and second halves of said bath of molten material, respectively, and for producing first and second signals representing the temperatures of the respective said halves;

(b) means for receiving and summing said first and second signal to produce a summation signal representative of any undesirable temperature differential in said halves of said bath of molten material;

(c) first and second feedback signal means actuated by said first and second controlling means, respectively, such feedback signal means producing feedback signals representing the positions of said first and second adjustable means;

(d) comparator means for receiving and comparing said summation signal and said feedback signals and producing a resultant signal representing changes necessary in said temperatures of said first and second halves of said bath of molten material to bring such temperatures back within said selected differential temperature range therefor; and (e) means responsive to said resultant signal for varying the response of said first and second controlling means to said differential signal, such controlling means then controlling said first and second adjustable means to effect said necessary changes in said temperatures of said halves of said bath of molten material.

2. The combination as in claim 1 and in which said bath of molten material is a bath of molten glass.

3. The combination as in claim 1 and in which the first mentioned temperature sensing means is a radiation pyrometer, and said first and second temperature responsive means are thermocouples.

4. Apparatus in accordance with claim 3 and in which said bath of molten material is a bath of molten glass.

5. A system for controlling temperatures of a bath of molten material in a forehearth, such system comprising, (a) first and second means for supplying heat to the first and second halves of said bath on opposite sides of the center of said forehearth;

(b) first and second means for controlling the amount of heat supplied by said first and second heat supplying means, respectively;

(c) first and second means at corresponding locations on opposite sides of said forehearth for sensing the temperatures of said first and second halves, respectively, of said bath, and producing first and second signals proportional to said temperatures;

(d) third means for sensing the temperature of said bath at a location approximately midway between said sides of said forehearth and producing a third signal proportional to such temperature;

(e) means for summing said first and second signals and producing a resultant fourth signal proportional to any difference between such summed signals;

(f) means for comparing said third signal with a preset signal proportional to the desired temperature for said bath at said midway location and producing a fifth signal proportional to any difference between the compared signals;

(g) first and second means for adjusting said first and second heat controlling means, respectively, and providing sixth and seventh signals, respectively, proportional to said adjustments;

(h) means responsive to said fifth signal for producing an eighth signal representing said difference between said compared signals;

(i) a comparator receiving said fourth, sixth, seventh, and eighth signals, such comparator normally supplying said eighth signal to said first and second adjusting means for actuation thereof in accordance with said difference between said compared signals, such comparator also summing said fourth, sixth and seventh signals to produce a ninth signal in accordance with the results of such summation, such ninth signal representing adjustments necessary in said first and second heat controlling means to control the temperatures of said first and second halves of said bath to a selected temperature differential for such halves, such ninth signal operating said comparator to adjust said supplying of said eighth signal to said first and second adjusting means to regulate such means to adjust said first and second heat controlling means, respectively, to control the temperatures of said first and second halves of said bath to said selected temperature differential for such halves while, concurrently therewith, actuating said first and second adjusting means in accordance with said compared signals to control the temperature of said bath as sensed by said third temperature sensing means to the desired temperature for such bath as represented by said preset signal means.

6. A system in accordance with claim 5 and in which said bath of molten material is a bath of molten glass.

7. A system in accordance with claim 5 and in which said first and second temperature sensing means are thermocouples and said third temperature sensing means is a radiation pyrometer.

8. A system in accordance with claim 7 and in which said bath of molten material is a bath of molten glass.

9. A system for maintaining the temperature of a bath of molten material at a desired temperature therefor and concurrently maintaining first and second corresponding halves of said bath at temperatures that differ from each other only by a selected maximum temperature differential, said system comprising;

(A) first means for sensing the temperature of said molten material at a location in said bath approximately midway between said halves thereof and producing a first signal proportional to such sensed temperature;

(B) means for comparing said first signal with a preset second signal proportional to said desired temperature for said bath and producing a third signal proportional to any difference in the compared signals;

(C) second and third means for sensing the temperatures of said molten material in said first and second halves of said bath, respectively, and at corresponding locations in such bath relatively remote from said midway location thereof, such second and third means producing fourth and fifth signals proportional to the respective sensed temperatures;

(D) means for comparing said fourth and fifth signals and producing a sixth signal proportional to any difference in such signals, such sixth signal representing a temperature difference in excess of said selected maximum differential;

(E) first and second adjustable means for variably controlling the supply of heat to said first and second halves, respectively, of said bath of molten material and for producing seventh and eighth signals proportional to the adjustment of said first and second adjustable means, respectively;

(F) first and second control means selectively responsive to said third signal for selectively controlling said first and second adjustable means to regulate the supply of heat to said first and second halves of said bath of molten material to return the temperature of such bath to said desired temperature therefor;

(G) means for algebraically summing said sixth, seventh and eighth signals to selectively produce ninth and tenth signals representing temperature differences exceeding, in first and second directions, respectively, said selected maximum temperature differential; and (H) third and fourth control means selectively responsive to said ninth and tenth signals, respectively, for varying said control by said first and second control means to return the temperatures of said first and second halves of said bath to temperatures that differ from each other only by said selected maximum temperature differential.

10. A system in accordance with claim 9 and in which each of said first and second adjustable means comprises a radiant burner, an adjustable valve for variably regulating fuel supplied to the respectively associated burner and an electrically driven valve positioner mechanically connected to the respectively associated valve for variable adjustment thereof.

11. A system in accordance with claim 10 and in which said first temperature sensing means is a radiation pyrometer and said second and third temperature sensing means are each a thermocouple.

12. A system in accordance with claim 11 and in which said bath of molten material is a bath of molten glass contained in a forehearth and said first and second halves of such bath are the halves thereof on opposite sides of the forehearth.

References Cited

UNITED STATES PATENTS

| | | | |
|---|---|---|---|
| 2,998,195 | 8/1961 | Kahn | 236—15B |
| 3,128,042 | 4/1964 | Daneman | 236—15B |

S. LEON BASHORE, Primary Examiner

J. B. HARDAWAY, Assistant Examiner

U.S. Cl. X.R.

13—6; 65—29, Dig. 13; 165—39; 235—151.1; 236—15B